US006511182B1

(12) United States Patent
Agostinelli et al.

(10) Patent No.: US 6,511,182 B1
(45) Date of Patent: Jan. 28, 2003

(54) AUTOSTEREOSCOPIC OPTICAL APPARATUS USING A SCANNED LINEAR IMAGE SOURCE

(75) Inventors: John A. Agostinelli, Rochester, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/010,500

(22) Filed: Nov. 13, 2001

(51) Int. Cl.[7] .......................... G03B 21/00; G02B 27/24
(52) U.S. Cl. ............................... 353/7; 359/472
(58) Field of Search .................... 353/7, 10, 30; 359/462, 466, 472, 478, 471, 479

(56) References Cited

U.S. PATENT DOCUMENTS

| | | |
|---|---|---|
| 4,124,978 A | 11/1978 | Wagner |
| 4,331,390 A | 5/1982 | Shafer |
| 4,623,223 A | 11/1986 | Kempf |
| 4,799,763 A | 1/1989 | Davis et al. |
| 4,854,688 A | 8/1989 | Hayford et al. |
| 5,206,499 A | 4/1993 | Mantravadi et al. |
| 5,225,028 A | 7/1993 | Bierens |
| 5,319,968 A | 6/1994 | Billing-Ross et al. |
| 5,572,229 A | 11/1996 | Fisher |
| 5,671,992 A | 9/1997 | Richards |
| 5,825,539 A | * 10/1998 | Hoshi ..................... 345/9 |
| 5,908,300 A | 6/1999 | Walker et al. |
| 5,940,564 A | 8/1999 | Jewell |
| 6,034,717 A | 3/2000 | Dentinger et al. |
| 6,233,100 B1 | 5/2001 | Chen et al. |
| 6,416,181 B1 * | 7/2002 | Kessler et al. .............. 353/7 |
| 2001/0015847 A1 * | 8/2001 | Sugawara .................... 359/462 |

OTHER PUBLICATIONS

G.J. Kintz; Autostereoscopic Properties of Spherical Panoramic Virtual Displays, SID 99 Digest, pp. 1000–1003.
S.A. Benton, T.E. Slowe, A.B. Kropp and S.L. Smith; Micropolarizer–Based Multiple–Viewer Autostereoscopic Display, Stereoscopic Displays and Virtual Reality Systems VI, SPIE, Jan. 1999, pp. 1–8.
S. McKay, G. Mair, S. Mason and K. Revie; Membrane Mirror Based Autostereoscopic Display for Tele–Operation and Telepresence Applications, Stereoscopic Displays and Virtual Reality Systems II, SPIE, vol. 3957, pp. 198–207.
W. Smith; Modern Optical Engineering, pp. 42–45.
E. Seibel, Q. Smithwick, C. Brown and P. Reinhall; Single Fiber Flexible Endoscope: General Design for Small Size, High Resolution, and Wide Field of View, SPIE, vol. 4158, pp. 29–39.

* cited by examiner

Primary Examiner—William Dowling
(74) Attorney, Agent, or Firm—Nelson Adrian Blish

(57) ABSTRACT

A monocentric arrangement of optical components providing stereoscopic display of a virtual image, electronically generated, line by line, from a linear image source (36) and projected, as a real intermediate image, near the focal surface (22) of a curved mirror (24) by means of a scanning ball lens assembly (100). To form each left and right intermediate image component, a separate image generation system (70) comprises a scanning ball lens assembly (100) comprising a spherical lens (46) for wide field of view and a reflective surface (102). A monocentric arrangement of optical components images the left and right scanning ball lens pupil at the corresponding left and right viewing pupil (14) of the observer (12) and essentially provides a single center of curvature for projection components. Use of such a monocentric arrangement with linear image source (36) and scanning ball lens assemblies (100) provides an exceptionally wide field of view with large viewing pupil (14).

82 Claims, 10 Drawing Sheets

AUTOSTEREOSCOPIC OPTICAL APPARATUS USING A SCANNED LINEAR IMAGE SOURCE

CROSS REFERENCE TO RELATED APPLICATIONS

Reference is made to commonly-assigned copending U.S. patent application Ser. No. 09/738,747, filed Dec. 15, 2000, entitled A MONOCENTRIC AUTOSTEREOSCOPIC OPTICAL APPARATUS AND METHOD, by Kessler et al.; U.S. patent application Ser. No. 09/854,699, filed May 14, 2001, entitled ADAPTIVE AUTOSTEREOSCOPIC DISPLAY SYSTEM, by Covannon et al., the disclosures of which are incorporated herein.

FIELD OF THE INVENTION

This invention generally relates to autostereoscopic display systems for viewing electronically generated images and more particularly relates to an apparatus and method for generating left- and right-eye images using a scanned linear image source with a monocentric arrangement of optical components to provide a very wide field of view and large exit pupils.

BACKGROUND OF THE INVENTION

The potential value of autostereoscopic display systems is widely appreciated particularly in entertainment and simulation fields. Autostereoscopic display systems include "immersion" systems, intended to provide a realistic viewing experience for an observer by visually surrounding the observer with a 3-D image having a very wide field of view. As differentiated from the larger group of stereoscopic displays that include it, the autostereoscopic display is characterized by the absence of any requirement for a wearable item of any type, such as, for example, goggles, headgear, or special glasses. That is, an autostereoscopic display attempts to provide "natural" viewing conditions for an observer.

In an article in *SID 99 Digest*, "Autostereoscopic Properties of Spherical Panoramic Virtual Displays," G. J. Kintz discloses one approach to providing autostereoscopic display with a wide field of view. Using the Kintz approach, no glasses or headgear are required. However, the observer's head must be positioned within a rapidly rotating spherical shell having arrays of LED emitters, imaged by a monocentric mirror, to form a collimated virtual image. Monocentric optical systems are characterized in that all optical surfaces share a common axis of symmetry. It is a generalization of the concentric system in which all optical surfaces share a common center of curvature at a single point. While the Kintz design provides one solution for a truly autostereoscopic system having a wide field of view, this design has considerable drawbacks. Among the disadvantages of the Kintz design is the requirement that the observer's head be in close proximity to a rapidly spinning surface. Such an approach requires measures to minimize the likelihood of accident and injury from contact with components on the spinning surface. Even with protective shielding, proximity to a rapidly moving surface could, at the least, cause the observer some apprehension. In addition, use of such a system imposes considerable constraints on head movement.

One class of autostereoscopic systems that operates by imaging the exit pupils of a pair of projectors onto the eyes of an observer is as outlined in an article by S. A. Benton, T. E. Slowe, A. B. Kropp, and S. L. Smith ("Micropolarizer-based multiple-viewer autostereoscopic display," in *Stereoscopic Displays and Virtual Reality Systems* VI, SPIE, January, 1999). Pupil imaging, as outlined by Benton in the above-mentioned article, can be implemented using large lenses or mirrors. An observer whose eyes are coincident with the imaged pupils can view a stereoscopic scene without crosstalk, without wearing eyewear of any kind.

It can be readily appreciated that the value and realistic quality of the viewing experience provided by an autostereoscopic display system using pupil imaging is enhanced by presenting the 3-D image with a wide field of view and large exit pupil. Such a system is most effective for immersive viewing functions if it allows an observer to be comfortably seated, without constraining head movement to within a tight tolerance and without requiring the observer to wear goggles or other device. For fully satisfactory 3-D viewing, such a system should provide separate, high-resolution images to right and left eyes. It can also be readily appreciated that such a system is most favorably designed for compactness, to create an illusion of depth and width of field, while occupying as little actual floor space and volume as is possible. For the most realistic viewing experience, the observer should be presented with a virtual image, disposed to appear a large distance away.

It is also known that conflict between depth cues associated with vergence and accommodation can adversely impact the viewing experience. Vergence refers to the degree at which the observer's eyes must be crossed in order to fuse the separate images of an object within the field of view. Vergence decreases, then vanishes as viewed objects become more distant. Accommodation refers to the requirement that the eye lens of the observer change shape to maintain retinal focus for the object of interest. It is known that there can be a temporary degradation of the observer's depth perception when the observer is exposed for a period of time to mismatched depth cues for vergence and accommodation. It is also known that this negative effect on depth perception can be mitigated when the accommodation cues correspond to distant image position.

An example of a conventional autostereoscopic display unit is disclosed in U.S. Pat. No. 5,671,992 (Richards), at which a seated observer experiences apparent 3-D visual effects created using images generated from separate projectors, one for each eye, and directed to the observer using an imaging system comprising a number of mirrors.

Conventional solutions for stereoscopic imaging have addressed some of the challenges noted above, but there is room for improvement. For example, some early stereoscopic systems employed special headwear, goggles, or eyeglasses to provide the 3-D viewing experience. As just one example of such a system, U.S. Pat. No. 6,034,717 (Dentingeret al.) discloses aprojection display system requiring an observer to wear a set of passive polarizing glasses in order to selectively direct the appropriate image to each eye for creating a 3-D effect.

Certainly, there are some situations for which headgear of some kind can be considered appropriate for stereoscopic viewing, such as with simulation applications. For such an application, U.S. Pat. No. 5,572,229 (Fisher) discloses a projection display headgear that provides stereoscopic viewing with a wide field of view. However, where possible, there are advantages to providing autostereoscopic viewing, in which an observer is not required to wear any type of device, as was disclosed in the device of U.S. Pat. No. 5,671,992. It would also be advantageous to allow some degree of freedom for head movement. In contrast, U.S. Pat.

No. 5,908,300 (Walker et al.) discloses a hang-gliding simulation system in which an observer's head is maintained in a fixed position. While such a solution may be tolerable in the limited simulation environment disclosed in the Walker et al. patent, and may simplify the overall optical design of an apparatus, constraint of head movement would be a disadvantage in an immersion system. Notably, the system disclosed in the Walker et al. patent employs a narrow viewing aperture, effectively limiting the field of view. Complex, conventional projection lenses, disposed in an off-axis orientation, are employed in the device disclosed in U.S. Pat. No. 5,908,300, with scaling used to obtain the desired output pupil size.

A number of systems have been developed to provide stereoscopic effects by presenting to the observer the combined image, through a beamsplitter, of two screens at two different distances from the observer, thereby creating the illusion of stereoscopic imaging, as is disclosed in U.S. Pat. No. 5,255,028 (Biles). However, this type of system is limited to small viewing angles and is, therefore, not suitable for providing an immersive viewing experience. In addition, images displayed using such a system are real images, presented at close proximity to the observer, and thus likely to introduce the vergence/accommodation problems noted above.

It is generally recognized that, in order to minimize vergence/accommodation effects, a 3-D viewing system should display its pair of stereoscopic images, whether real or virtual, at a relatively large distance from the observer. For real images, this means that a large display screen must be employed, preferably placed a good distance from the observer. For virtual images, however, a relatively small curved mirror can be used as is disclosed in U.S. Pat. No. 5,908,300 (Walker). The curved mirror acts as a collimator, providing a virtual image at a large distance from the observer. Another system for stereoscopic imaging is disclosed in "Membrane Mirror Based Autostereoscopic Display for Tele-Operation and Telepresence Applications," in Stereoscopic Displays and Virtual Reality Systems VII, Proceedings of SPIE, Volume 3957 (McKay, Mair, Mason, Revie) which uses a stretchable membrane mirror. Although the apparatus disclosed in the McKay article provides a small exit pupil, it is likely that this pupil could be enlarged somewhat simply by scaling the projection optics. However, the apparatus disclosed in the McKay article has limited field of view, due to the use of conventional projection optics and due to dimensional constraints that limit membrane mirror curvature.

Curved mirrors have also been used to provide real images in stereoscopic systems, wherein the curved mirrors are not used as collimators. Such systems are disclosed in U.S. Pat. No. 4,623,223 (Kempf); and U.S. Pat. No. 4,799,763 (Davis et al.) for example. However, systems such as these are generally suitable where only a small field of view is needed.

Notably, existing solutions for stereoscopic projection project images onto a flat screen, even where that image is then reflected from a curved surface. This can result in undesirable distortion and other image aberration, constraining field of view and limiting image quality overall.

From an optical perspective, it can be seen that there would be advantages to autostereoscopic design using pupil imaging. A system designed for pupil imaging must provide separate images to the left and right pupils correspondingly and provide the most natural viewing conditions, eliminating any need for goggles or special headgear. In addition, it would be advantageous for such a system to provide the largest possible pupils to the observer, so as to allow some freedom of movement, and to provide an ultra-wide field of view. It is recognized in the optical arts that each of these requirements, by itself, can be difficult to achieve. An ideal autostereoscopic imaging system must meet the challenge for both requirements to provide a more fully satisfactory and realistic viewing experience. In addition, such a system must provide sufficient resolution for realistic imaging, with high brightness and contrast. Moreover, the physical constraints presented by the need for a system to have small footprint, and dimensional constraints for interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

Monocentric imaging systems have been shown to provide significant advantages for high-resolution imaging of flat objects, such as is disclosed in U.S. Pat. No. 3,748,015 (Offner), which teaches an arrangement of spherical mirrors arranged with coincident centers of curvature in an imaging system designed for unit magnification. The monocentric arrangement disclosed in the Offner patent minimizes a number of types of image aberration and is conceptually straightforward, allowing a simplified optical design for high-resolution catoptric imaging systems. A monocentric arrangement of mirrors and lenses is also known to provide advantages for telescopic systems having wide field of view, as is disclosed in U.S. Pat. No. 4,331,390 (Shafer). However, while the advantages of monocentric design for overall simplicity and for minimizing distortion and optical aberrations can be appreciated, such a design concept can be difficult to implement in an immersion system requiring wide field of view and large exit pupil with a reasonably small overall footprint. Moreover, a fully monocentric design would not meet the requirement for full stereoscopic imaging, requiring separate images for left and right pupils.

As is disclosed in U.S. Pat. No. 5,908,300, conventional wide-field projection lenses can be employed as projection lenses in a pupil-imaging autostereoscopic display. However, there are a number of disadvantages with conventional approaches. Wide-angle lens systems, capable of angular fields such as would be needed for effective immersion viewing, would be very complex and costly. Typical wide angle lenses for large-format cameras, such as the Biogon™ lens manufactured by Carl-Zeiss-Stiftung in Jena, Germany for example, are capable of 75-degree angular fields. The Biogon lens consists of seven component lenses and is more than 80 mm in diameter, while only providing a pupil size of 10 mm. For larger pupil size, the lens needs to be scaled in size; however, the large diameter of such a lens body presents a significant design difficulty for an autostereoscopic immersion system, relative to the interocular distance at the viewing position. Costly cutting of lenses so that right- and left-eye assemblies could be disposed side-by-side, thereby achieving a pair of lens pupils spaced consistently with human interocular separation, presents difficult manufacturing problems. Interocular distance limitations constrain the spatial positioning of projection apparatus for each eye and preclude scaling of pupil size by simple scaling of the lens. Moreover, an effective immersion system most advantageously allows a very wide field of view, preferably well in excess of 90 degrees, and would provide large exit pupil diameters, preferably larger than 20 mm.

As an alternative for large field of view applications, ball lenses have been employed for specialized optical functions, particularly miniaturized ball lenses for use in fiber optics coupling and transmission applications, such as is disclosed in U.S. Pat. No. 5,940,564 (Jewell) which discloses advantageous use of a miniature ball lens within a coupling device. On a larger scale, ball lenses can be utilized within an astronomical tracking device, as is disclosed in U.S. Pat. No. 5,206,499 (Mantravadi et al.) In the Mantravadi et al. patent, the ball lens is employed because it allows a wide field of view, greater than 60 degrees, with minimal off-axis aberrations or distortions. In particular, the absence of a unique optical axis is used advantageously, so that every principal ray that passes through the ball lens can be considered to define its own optical axis. Because of its low illumination falloff relative to angular changes of incident light, a single ball lens is favorably used to direct light from space to a plurality of sensors in this application. Notably, photosensors at the output of the ball lens are disposed along a curved focal plane.

The benefits of a spherical or ball lens for wide angle imaging are also utilized in an apparatus for determining space-craft attitude, as is disclosed in U.S. Pat. No. 5,319,968 (Billing-Ross et al.) Here, an array of mirrors direct light rays through a ball lens. The shape of this lens is advantageous since beams which pass through the lens are at normal incidence to the image surface. The light rays are thus refracted toward the center of the lens, resulting in an imaging system having a wide field of view.

Another specialized use of ball lens characteristics is disclosed in U.S. Pat. No. 4,854,688 (Hayford et al.) In the optical arrangement of the Hayford et al. patent, directed to the transmission of a CRT-generated 2-dimensional image along a non-linear path, such as attached to headgear for a pilot, a ball lens directs a collimated input image, optically at infinity, for a pilot's view.

Another use for wide-angle viewing capabilities of a ball lens is disclosed in U.S. Pat. No. 4,124,978 (Thompson), which teaches use of a ball lens as part of an objective lens in binocular optics for night viewing.

With U.S. Pat. Nos. 4,124,978 and 4,854,688 described above that disclose use of a ball lens in image projection, there are suggestions of the overall capability of the ball lens to provide, in conjunction with support optics, wide field of view imaging. However, there are substantial problems that must be overcome in order to make effective use of such devices for immersive imaging applications, particularly where an image is electronically processed to be projected. For example, conventional electronic image presentation techniques, using devices such as spatial light modulators, provide an image on a flat surface. Ball lens performance with flat field imaging would be extremely poor.

There are also other basic optical limitations for immersion systems that must be addressed with any type of optical projection that provides a wide field of view. An important limitation is imposed by the Lagrange invariant. Any imaging system conforms to the Lagrange invariant, whereby the product of pupil size and semi-field angle is equal to the product of the image size and the numerical aperture and is an invariant for the optical system. This can be a limitation when using, as an image generator, a relatively small spatial light modulator or similar pixel array which can operate over a relatively small numerical aperture since the Lagrange value associated with the device is small. A monocentric imaging system, however, providing a large field of view with a large pupil size (that is, a large numerical aperture), inherently has a large Lagrange value. Thus, when this monocentric imaging system is used with a spatial light modulator having a small Lagrange value, either the field or the aperture of the imaging system, or both, will be underfilled due to such a mismatch of Lagrange values. For a detailed description of the Lagrange invariant, reference is made to *Modern Optical Engineering, The Design of Optical Systems* by Warren J. Smith, published by McGraw-Hill, Inc., pages 42–45.

Copending U.S. patent applications Ser. Nos. 09/738,747 and 09/854,699 take advantage of capabilities for wide field of view projection using a ball lens in an autostereoscopic imaging system. In both of these copending applications, the source image that is provided to the projecting ball lens for each eye is presented as a complete two-dimensional image. The image source disclosed in each of these applications is a two-dimensional array, such as an LCD, a DMD, or similar device. The image source could alternately be a CRT which, even though generated by a scanned electron beam, presents a complete two-dimensional image to ball lens projection optics.

There are some inherent limitations in providing a complete two-dimensional image. Ideally, a curved image field is preferred, with the center of curvature of this field coincident with the center of the ball lens, since this arrangement minimizes field aberrations. However, providing a curved image field requires either curving the image source itself or providing an additional faceplate or special relay optics in the imaging path. Curving a two-dimensional image array to obtain or approximate spherical curvature of the image source would be difficult and costly. Employing a faceplate or special relay optics with a planar image array has disadvantages including added cost and overall loss of brightness. Maintaining sufficient brightness for projection is a concern when using small two-dimensioned arrays, since this can be difficult to achieve without special design techniques and higher-cost components. Thus, it can be appreciated that there can be improvements to overall cost of system optics for generating and projecting images for stereoscopic viewing.

Ball lenses and ball lens segments have been used as scanning components in sensor applications for wide field-of-view optical scanning. U.S. Pat. No. 6,233,100 (Chen et al.) discloses a concentric sensor scanning system that employs a rotatable scanning ball lens segment with one or more reflective facets. In the system disclosed in U.S. Pat. No. 6,233,100, rotation of a ball lens or ball lens segment directs incoming radiation onto a concentric row of sensors. However, existing projection systems designs have utilized more conventional projector optics components and, in doing this, have overlooked possible deployment of ball lenses or ball lens segments as scanning components for projecting light in a scanned fashion in order to produce an image.

Thus it can be seen that, while there are some conventional approaches that meet some of the requirements for stereoscopic imaging, there is a need for an improved autostereoscopic imaging solution for viewing electronically generated images, where the solution provides a structurally simple apparatus, minimizes aberrations and image distortion, and meets demanding requirements for wide field of view, large pupil size, high brightness, and lowered cost.

SUMMARY OF THE INVENTION

It is an object of the present invention to provide a monocentric autostereoscopic optical apparatus for viewing a stereoscopic virtual image comprising an array of image pixels, the stereoscopic virtual image comprising a left image to be viewed by an observer at a left viewing pupil and a right image to be viewed by the observer at a right viewing pupil, the apparatus comprising:

(a) a left image generation system for forming a left intermediate image as a two-dimensional image and a right image generation system for forming a right intermediate image as a two-dimensional image, wherein both left and right image generation systems are similarly constructed of separate components, with each image generation system comprising:
  (a1) a linear image source for forming a line of source pixels;
  (a2) a scanning ball lens assembly for projecting the line of source pixels to form an intermediate line image, the scanning ball lens assembly comprising:
    (a2a) at least one reflective surface for reflecting light from the line of source image pixels to the intermediate line image;
    (a2b) a ball lens segment having a scanning ball lens pupil, the ball lens segment having a center of curvature on the one reflective surface,
    (a3c) the scanning ball lens assembly rotating about an axis and forming a series of the intermediate line images in order to sequentially form the intermediate image as a scanned two-dimensional image thereby, (b) a curved mirror having a center of curvature placed substantially optically midway between the scanning ball lens assembly for the left image generation system and the scanning ball lens assembly for the right image generation system;

(c) a beamsplitter disposed to fold the optical path from the left image generation system to form the left intermediate image near a front focal surface of the curved mirror and to fold the optical path from the right image generation system to form the right intermediate image near the front focal surface of the curved mirror; and (d) the curved mirror forming the virtual stereoscopic image of the left and right intermediate images and, through the beamsplitter, forming a real image of the left scanning ball lens pupil at the left viewing pupil and a real image of the right scanning ball lens pupil at the right viewing pupil.

A feature of the present invention is the use of a monocentric arrangement of optical components, thus simplifying design, minimizing aberrations and providing a wide field of view with large exit pupils.

A further feature of the present invention is the use of a linear image source, such as a combination comprising a scanned point source and a diffusive surface or a linear array of light sources, scanned by a ball lens segment having a reflective surface in order to provide a scanned intermediate image.

A further feature of the present invention is that it allows a number of configurations, including configurations that minimize the number of optical components required, even including configurations that eliminate the need for a beamsplitter.

It is an advantage of the present invention is that it eliminates the need for a higher cost two-dimensional surface as image source, replacing this with a lower cost scanned point source or linear array.

It is a further advantage of the present invention that it allows use of inexpensive, bright light sources for generating an intermediate image for projection.

It is a further advantage of the present invention that it provides a compact arrangement of optical components, capable of being packaged in a display system having a small footprint.

It is a further advantage of the present invention that it allows high-resolution stereoscopic electronic imaging with high brightness and high contrast, with a very wide field of view. The present invention provides a system that is very light-efficient, capable of providing high brightness levels for projection.

It is a further advantage of the present invention that it provides a solution for wide field stereoscopic projection that is inexpensive when compared with the cost of conventional projection lens systems.

It is a further advantage of the present invention that it provides stereoscopic viewing without requiring an observer to wear goggles or other device.

It is yet a further advantage of the present invention that it provides an exit pupil of sufficient size for non-critical alignment of an observer in relation to the display.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
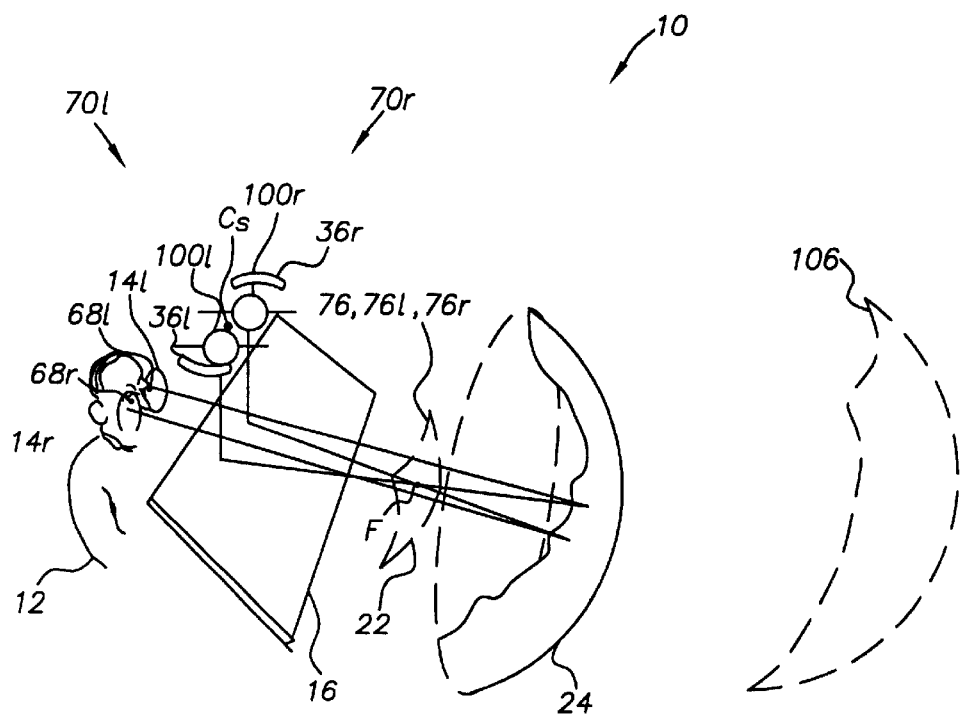
FIG. 1 is a perspective view showing key components of the apparatus of the present invention in an autostereoscopic imaging system.

Referring to FIG. 1, there is shown a perspective view of an autostereoscopic imaging system 10. An observer 12 is typically seated in position to view a virtual stereoscopic image from left and right viewing pupils 14l and 14r. Optimal viewing conditions are obtained when left and right eye pupils 68l and 68r of observer 12 are coincident with the position of corresponding left and right viewing pupils 14l and 14r.

A left image generation system 70l comprising a left scanning ball lens assembly 100l and a left linear image source 36l project the image intended for left viewing pupil 14l. Correspondingly, a right image generation system 70r comprising a right scanning ball lens assembly 100r and a right linear image source 36r project the image intended for right viewing pupil 14r. Left image generation system 70l directs an image to a beamsplitter 16 which is interposed between observer 12 and a curved mirror 24. A left intermediate image 76l is formed near a focal surface 22 of curved mirror 24. Left intermediate image 76l is presented at left pupil 14l as a virtual image 106, which appears to observer 12 as if the image is behind curved mirror 24. In similar fashion, right image generation system 70r directs an image to beamsplitter 16 which is interposed between observer 12 and curved mirror 24. A right intermediate image 76r is thereby formed near focal surface 22 of curved mirror 24. Right intermediate image 76r is presented at right pupil 14r as a virtual image 106, which appears to observer 12 as if the image is behind curved mirror 24. As a result, observer 12 is presented with a virtual stereoscopic image that comprises separate left and right images. The virtual stereoscopic image appears to be behind curved mirror 24, somewhere between the rear of curved mirror 24 and infinity.

The description that follows primarily focuses on the optical components that direct light to either one of viewing pupils 14l and 14r. It should be noted that similar optical components are employed for left image generation system and right image generation system, that is, for both left and right optical paths. For clarity, the description that follows applies to both right and left image generation system 70 components. Any distinction between right and left optical paths is made only when it is necessary to be precise. (Appended left "l" or right "r" designators for part numbers are, for this reason, omitted from this description unless needed.)

It must be noted that, as shown in FIG. 1, there are two components to the stereoscopic image seen by observer 12. As is represented in FIG. 1, the left and right optical paths cross in system 10, due to imaging by curved mirror 24.

FIG. 1 illustrates some of the key problems to be solved, from an optical design perspective, and shows an overview of the solution provided by the present invention. It is instructive to review key design considerations for achieving the most life-like stereoscopic viewing. In order to provide observer 12 with an effective immersion experience, a wide field of view is important, in excess of the 60 degrees available using prior art techniques. In order to be used comfortably by observer 12, viewing pupils 14l, 14r must be sufficiently large. As a design goal, system 10 of the present invention is intended to provide a field of view of at least 90 degrees with the diameter of viewing pupil 14 in excess of 20 mm diameter. To provide a viewable stereoscopic virtual image over a range of human interocular separations, scanning ball lens assemblies 100l and 100r are advantageously separated by an appropriate, empirically determined interaxial distance.

Alternately, the interaxial distance between scanning ball lens assemblies 100l and 100r could be manually adjusted to suit interocular dimensions of observer 12 or could be automatically sensed and adjusted by system 10. Components of left and right image generation systems 70l and 70r could be mounted on a boom, for example, allowing movement of each image generation system 70l/70r relative to the other in order to compensate for interocular distance differences. Reference is made to commonly assigned application Ser. No. 09/854,699, which describes automated sensing and adjustment of left- and right-eye projection assemblies using ball lenses. The same feedback loop apparatus and methods disclosed in this earlier application could also be applied for the apparatus of the present invention.

Monocentric Design of Image Path

Figure 2A:
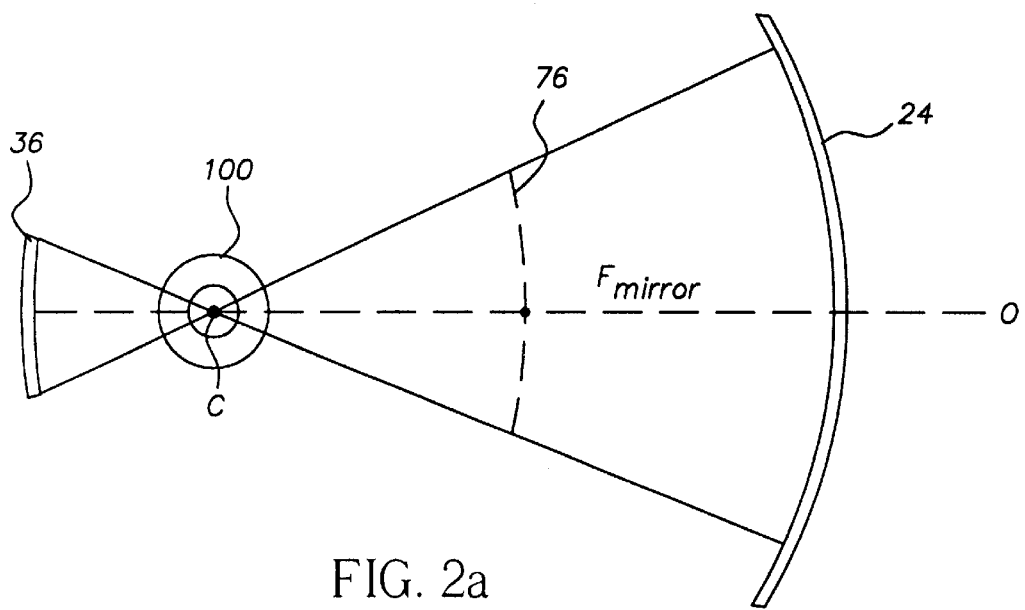
FIGS. 2a and 2b are side and top schematic views, respectively, showing the substantially concentric relationship of projection optics in an optically unfolded view.
Figure 2B:
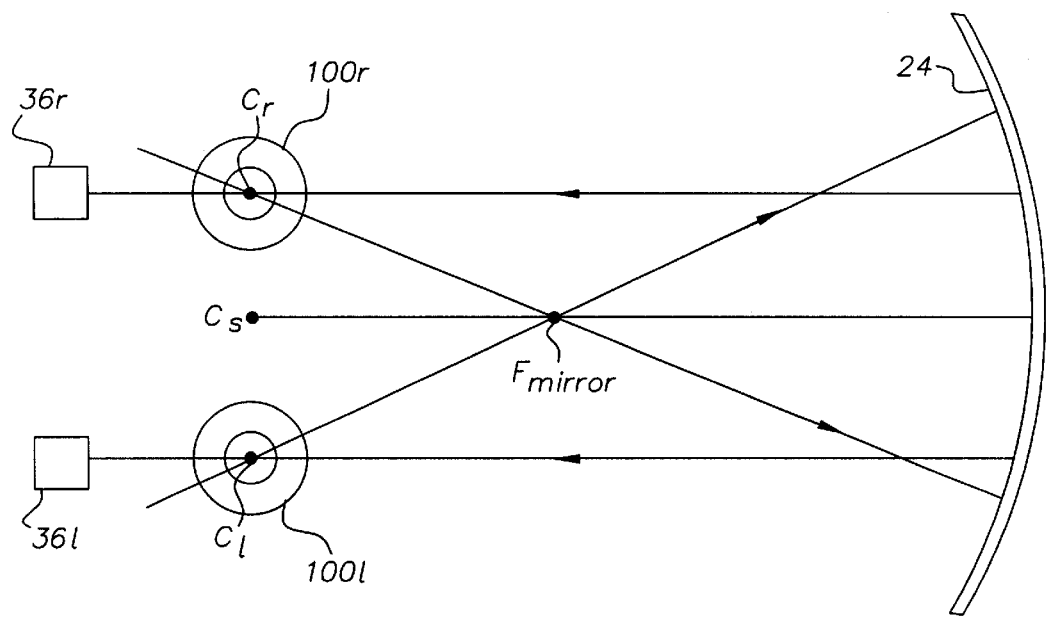

The monocentric arrangement of optical components in the apparatus of the present invention provides a number of clear advantages for minimizing image aberrations and for maximizing field of view. Referring to FIG. 2a, there is shown, from a side view, the optically concentric relationship of key components in the optical path, in unfolded form, applicable for both left and right image generation systems 70l and 70r. Referring to the top view of FIG. 2b, the center of curvature of mirror 24 is $C_s$, located midway between left and right scanning ball lens assemblies 100l and 100r. In the general scheme shown in FIG. 2a, linear image source 36, which is preferably curved with the center of its radius of curvature at the center labeled C or $C_s$, generates, as source pixels, a narrow line of the image to be projected, one line at a time. Scanning ball lens assembly 100 projects the line of source pixels from linear image source 36 to form intermediate image 76. As is represented in FIG. 2a, intermediate image 76 is also curved, sharing the same center of curvature as scanning ball lens assembly 100, at center C. Referring to FIGS. 1 and 2a, intermediate image 76 is located near focal surface 22 of curved mirror 24. Focal point $F_{mirror}$ of curved mirror 24 lies at the intersection of focal surface 22 with optical axis O. Curved mirror 24 is preferably spherical, again sharing the same center of curvature as scanning ball lens assembly 100 at center C.

It is instructive to observe that FIG. 2a gives a generalized, first approximation of the relationship of components in the unfolded optical path. Referring more closely to the top view of FIG. 2b, there is shown the actual position of the center of curvature of curved mirror 24, labeled $C_s$, in FIG. 2b, midway between the centers of curvature of left and right scanning ball lens assemblies 100*l* and 100*r*, labeled C*l* and C*r* respectively. It is also instructive to observe that the ideal placement of left and right scanning ball lens assemblies 100*l* and 100*r* for observer 12 would be such that their real images, formed by curved mirror 24, would correspond with the position and interocular separation of left and right viewing pupils 14*l* and 14*r*, respectively.

Referring back to FIG. 1 by way of reference, the optimal position of intermediate image 76 is within a range that can be considered "near" focal surface 22. The preferred range extends from focal surface 22 itself as an outer limit to within approximately 20% of the distance between focal surface 22 and the surface of curved mirror 24 as an inner limit. If intermediate image 76 were formed between focal surface 22 and observer 12, virtual image 106 would appear to be out of focus.

Because scanning lens assembly 100 is spherical with center of curvature at center C, as the unfolded arrangement of FIG. 2*a* shows, a wide field of view can be provided, with minimal image aberration. It must be noted that the design of the present invention is optimized for unity pupil magnification; however, some variation from unity pupil magnification is possible, within the scope of the present invention.

Figure 3:
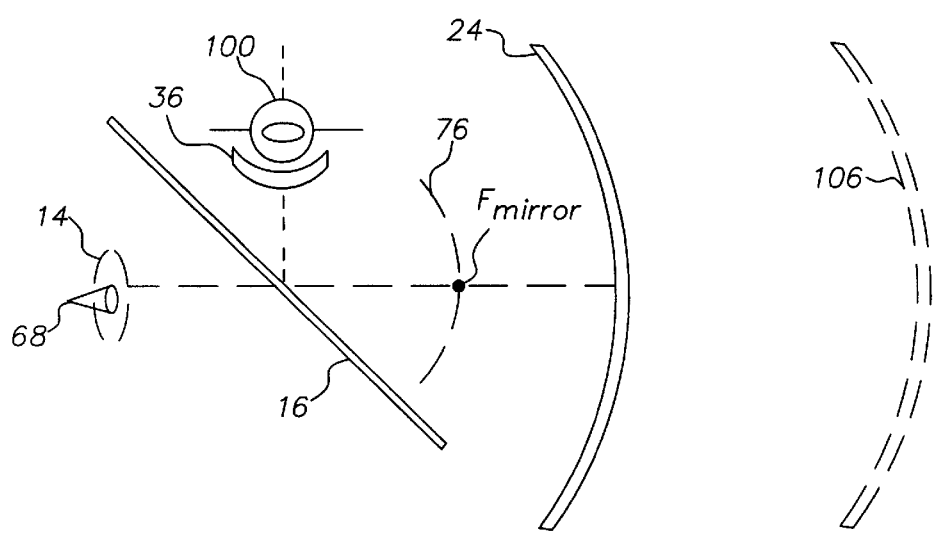
FIG. 3 is a schematic view showing the concentric relationship of projection optics as used by the system, in an optically folded view.

FIG. 3 shows a side view of the folded optical arrangement represented in FIG. 2*a*, showing how viewing pupil 14 is formed by the addition of beamsplitter 16. Beamsplitter 16 directs the light projected from scanning ball lens assembly 100 to form intermediate image 76. Virtual image 106 formed by curved mirror 24 is thereby visible, through beamsplitter 16, at viewing pupil 14.

It is important to keep in mind that the optical paths represented in FIGS. 2*a* and 3 the following are duplicated, with independent left and right image generation systems 70*l* and 70*r*.

Operation of Image Generation System 70

Scanning ball lens assembly 100 functions as both a reflective scanner and as a projection lens. Referring to FIGS. 4 through 7, both scanning and projection functions are shown. A reflective surface 102 within scanning ball lens assembly 100, as is shown in FIG. 5, performs the scanning function, much like the scanning mirror or polygon familiar in the optical scanning arts. In this scanning function, scanning ball lens assembly 100 rotates about an axis A in order to sequentially project each individual line of intermediate image 76 as the line is formed by linear image source 36.

Linear image source 36 provides image generation system 70 with a line of source pixels, generated from image data. As is well known in the electronic imaging arts, there are a number of general methods commonly used for generating a line of source pixels. For example, a line of source pixels can be generated by scanning a single beam of radiation over a responsive surface in a linear pattern, following the conventional model of the CRT. Alternately, a line of source pixels can be generated by an array of individual light sources, illuminated in an appropriate pattern. In any particular apparatus, the selection of one method over another would be based on factors such as cost, brightness requirements, speed, and component sizing, for example.

Figure 5:
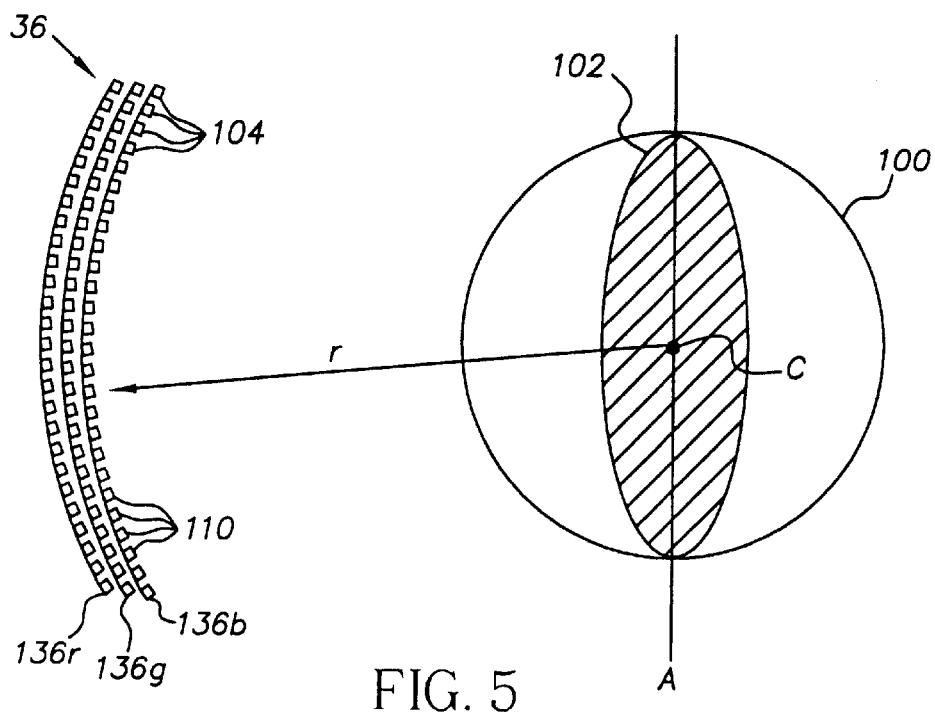
FIG. 5 is a side view representation showing the relationship of the curved linear image source and the scanning ball lens assembly.
Figure 6:
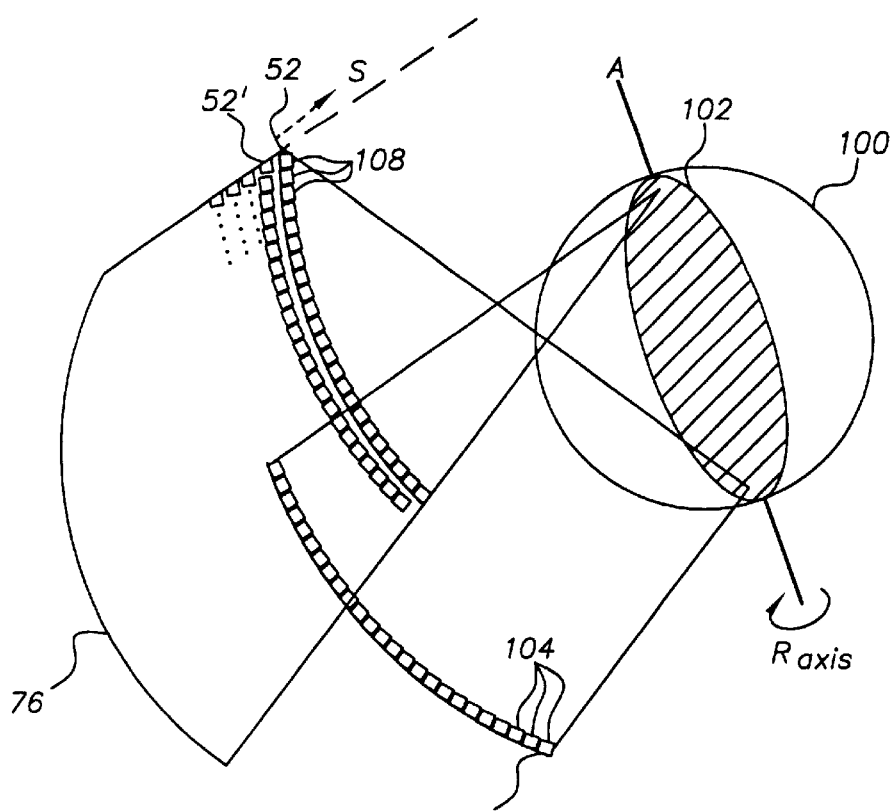
FIG. 6 is a perspective view showing, in exaggerated detail, how successive lines of pixels are scanned to form the intermediate image.

In a preferred embodiment of the present invention, an array of individual light sources is used for generating a line of source pixels, as is shown in FIGS. 5 and 6. Alternative methods and variations for generating a line of source pixels and considerations for use are described in a subsequent section.

Referring to FIG. 5, linear image source 36 comprises a plurality of light sources 110 that correspondingly provide source pixels 104, in a linear arrangement. As is particularly shown in FIG. 5, linear image source 36 is preferably curved so that each source pixel 104 is at an equivalent radial distance r from center C of scanning ball lens assembly 100. In a preferred embodiment, each light source 110 is a high-brightness LED, such as NSP series (Gallium Indium Nitride) LED lamps from Nichia Corporation, headquartered in Tokushima, Japan. Linear image source 36 could alternately be fabricated from an LED light bar, such as the HLCP and HLMP series devices manufactured by Agilent Technologies, Inc. Another type of linear image source could be fabricated from GaAsP (Gallium Arsenide Phosphide) technology, using devices manufactured by Optotek, Ltd., Ontario, Canada. Linear image source 36 is itself controlled by imaging circuitry (not shown) that provides an image as an array of source pixels 104, one line at a time, coordinated in a sequence that is synchronous with the rotation speed of scanning ball lens assembly 100.

Where linear image source 36 comprises individual light sources 110 as array elements, the modulation of each individual light source 110 can be performed using any of the well-known techniques for modulating light output. Conventional methods include pulse-width modulation and amplitude modulation. Bit-oriented pulse-width modulation could be used, for example, whereby the total energy delivered to light source 110 for forming one line is the sum of pulse widths having, for example, a bit depth of 8 bits. Amplitude modulation operates by simply varying the level of drive current applied to light source 110 for forming one line. A combination of pulse-width modulation with amplitude modulation could alternately be used to provide expanded dynamic range.

As FIG. 5 shows, linear image source 36 has separate color components in order to project a color image. In a preferred embodiment, linear image source 36 comprises a red linear array 136*r*, a green linear array 136*g*, and a blue linear array 136*b*. In a manner well known in the color projection arts, the relative intensity of light beams from red, green, and blue linear arrays 136*r*, 136*g*, and 136*b* and their superposition or juxtaposition then determines the composite color output of the light provided as each source pixel 104.

For the description that follows, it is assumed that all color components of linear image source 36 can be illuminated, in a suitable timing sequence, for color projection. For simplicity, subsequent description treats linear image source 36 as one array of source pixels 104.

Scanning Activity

Referring to FIG. 6, the scanning action by which scanning ball lens assembly 100 projects the line of source pixels 104 from its reflective surface 102 to form an intermediate line image 52, which comprises a line of image pixels 108, is represented. For illustration, only a small number of source pixels 104 is represented in FIG. 6. In a preferred embodiment, linear image source 36 provides a line containing at least a few hundred individual source pixels 104, each individual source pixel 104 imaged to a corresponding image pixel 108 within intermediate line image 52. As scanning ball lens assembly 100 rotates about axis A in the $R_{axis}$ direction, successive intermediate line images 52 are formed. In this way, intermediate line image 52' is formed at one instant, then, after a predetermined rotation distance of scanning ball lens assembly 100, the next intermediate line image 52 is formed, and so on. Due to the characteristics of scanning ball lens assembly 100 projection, source pixels 104 in linear image source 36 are inverted to form intermediate line image 52. As indicated in FIG. 6, this continuing activity forms intermediate image 76 by scanning in the S direction.

Referring back to FIG. 4, there is shown a perspective view of the scanning action of image generation system 70 for forming intermediate image 76 near focal surface 22 of curved mirror 24. It is instructive to note that the apparatus and method of the present invention allow the aspect ratio of intermediate image 76 to be variable within a range. With reference to FIG. 6, the length of the line of source pixels 104 generated by linear image source 36 can be a value less than the maximum available line length. In the orthogonal direction, the number of lines of source pixels 104 can also be less than the maximum number of lines available. By varying the number of source pixels 104 and number of intermediate line images 52 created, image generation system 70 can optimize the aspect ratio of intermediate image 76 to suit both the performance characteristics of autostereoscopic imaging system 10 and the preferences of observer 12.

Figure 7A:
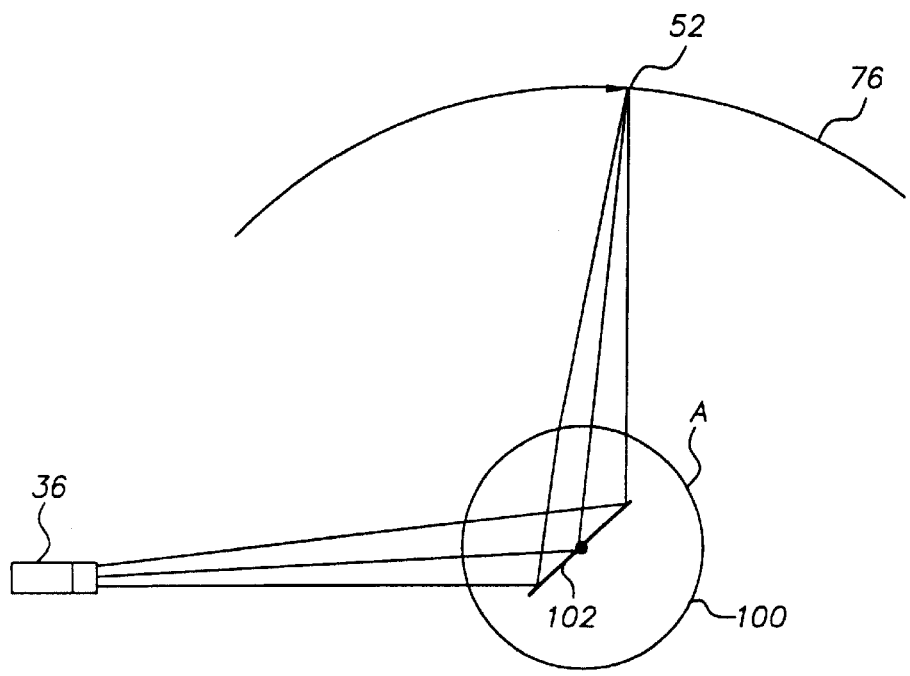
FIGS. 7a–7c are top views showing the relationship of the curved linear image source and scanning ball lens assemblies and the interaction of these components in order to create a scanned intermediate image.
Figure 7B:
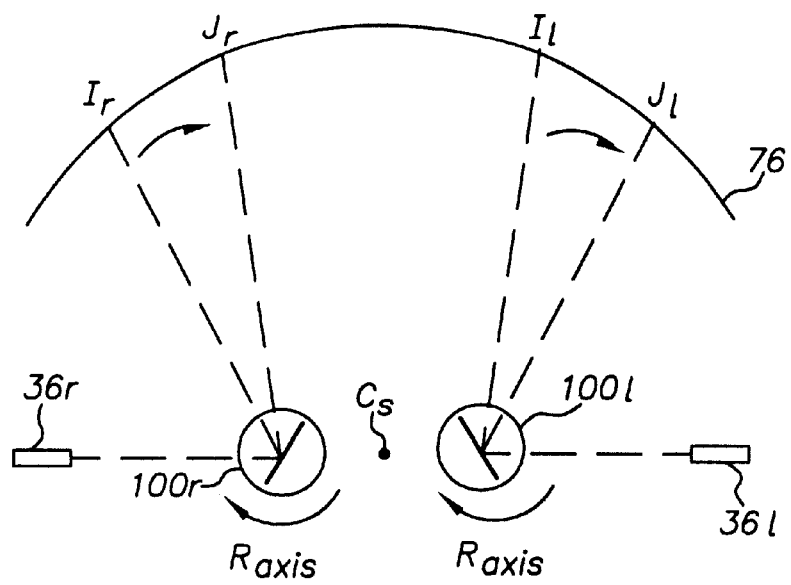
Figure 7C:
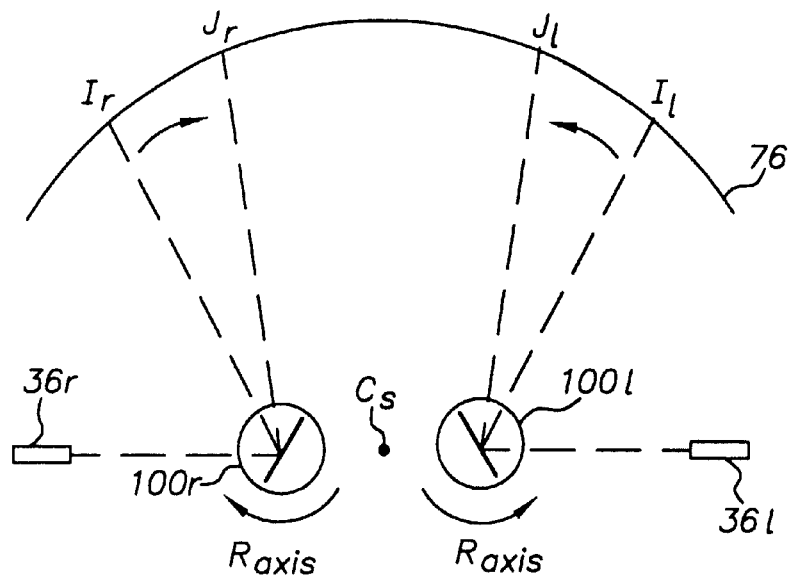

Referring to FIG. 7a, there is shown a top view of the rotation of scanning ball lens assembly 100 for forming intermediate image 76, one intermediate line image 52 at a time. As has been noted, intermediate image 76 is formed by the scanning action of both left and right scanning ball lens assemblies 100$l$ and 100$r$. Referring to FIGS. 7b and 7c, there are shown alternate ways in which left and right scanning ball lens assemblies 100$l$ and 100$r$ may rotate with respect to each other. In the example of FIG. 7b, both right and left scanning ball lens assemblies 100$l$ and 100$r$ rotate in the same direction as they sweep out intermediate line images 52 from an initial position $I_l$ and $I_r$ to a subsequent position $J_l$, and $J_r$, respectively. By contrast, FIG. 7c shows left and right scanning ball lens assemblies 100$l$ and 100$r$ rotating in the opposite direction. Either type of pattern could be used in an image generation system 70.

Figure 4:
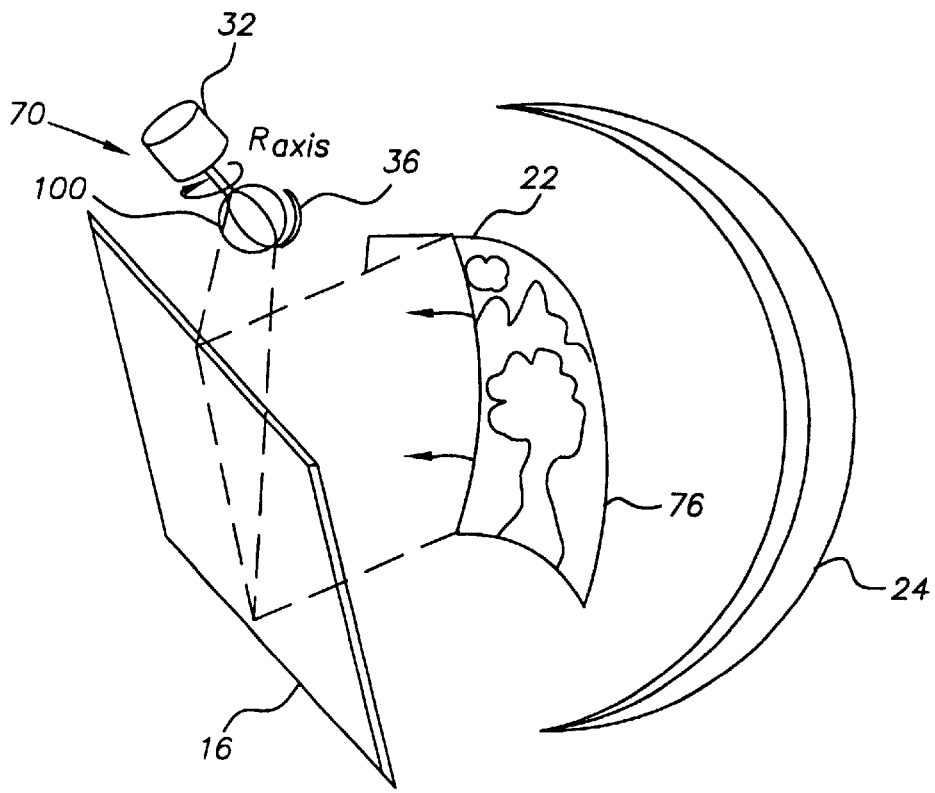
FIG. 4 is a perspective view showing, for one left or right image, the scanning action obtained from cooperation of a linear image source and scanning ball lens assembly.

As is shown in FIG. 4, a motor 32 is used to drive the rotation of scanning ball lens assembly 100. In a preferred embodiment, the rotational speed of scanning ball lens assembly 100 is 1800 RPM. Of course, by using a series of gears, belts, or other components for drive translation, with techniques well known in the mechanical arts, both left and right scanning ball lens assemblies 100$l$ and 100$r$ could be driven using a single motor 32.

Fabrication of Scanning Ball Lens Assembly 100

Figure 8:
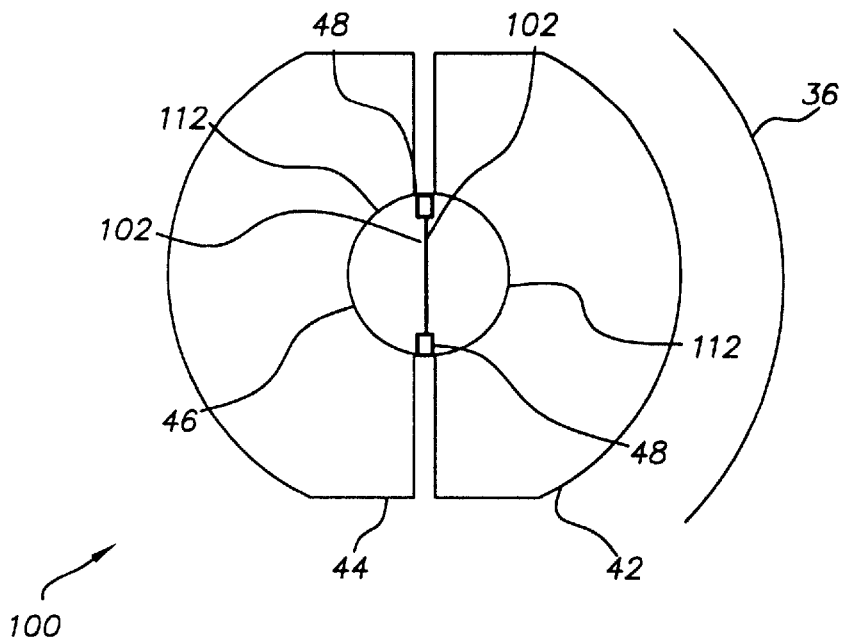
FIG. 8 is a cross-section view showing the composition of a scanning ball lens assembly.

Referring to FIG. 8, there is shown, in cross-sectional view, the structure of scanning ball lens assembly 100 in a preferred embodiment. A central spherical lens 46 is disposed between two meniscus lenses 42 and 44. Meniscus lenses 42 and 44 have indices of refraction and other characteristics intended to minimize on-axis spherical and chromatic aberration, as is well known in the optical design arts. Stops 48 limit the entrance pupil within scanning ball lens assembly 100. Stops 48 need not be physical, but may alternately be implemented using total internal reflection at the interfaces between outer meniscus lens 42 and spherical lens 46.

In a preferred embodiment, meniscus lenses 42 and 44 are selected to reduce image aberration and to optimize image quality at intermediate image 76. It must be noted that scanning ball lens assembly 100 could comprise any number of arrangements of support lenses surrounding central spherical lens 46. Surfaces of these support lenses, however many are employed, would share a common center of curvature C with central spherical lens 46. Moreover, the refractive materials used for lens components of scanning ball lens assembly 100 could be varied, within the scope of the present invention. For example, in addition to standard optical glass lenses, central spherical lens 46 could be plastic, with meniscus lenses 42 and 44 made of glass, plastic, enclosed liquids, or other suitable refractive materials, all within the scope of the present invention. In its simplest embodiment, scanning ball lens assembly 100 could be simply a single central spherical lens 46 with its reflective surface 102.

A planar reflective surface 102 can be fabricated in a number of different ways. In a preferred embodiment, reflective surface 102 is two-sided, formed on one half of the hemisphere used for spherical lens 46, using an aluminum coating. Scanning ball lens assembly 100 is then assembled, typically using an optical cement, to provide reflective surface 102 on the meridional plane of scanning ball lens assembly 100, with two opposite reflective sides. As another option, at higher cost, a broadband interference coating could be applied to either or both hemispheres of spherical lens 46 for improved reflectivity.

Referring again to FIG. 8, the optimal arrangement for mechanical rotation is to provide reflective surface 102 as a two-sided mirror, so that a hemispheric lens segment 112 is disposed on top of each reflective surface 102. As an alternative, the lens structure of scanning ball lens assembly 100 could simply be a single hemispheric lens segment 112, with only a one-sided reflective surface 102. In that case, however, other mechanical techniques for partial rotation of scanning ball lens assembly 100 would need to be employed. For example, it would be possible to use scanning ball lens assembly 100 having only one hemispheric lens segment 112, so that reflective surface 102 is one-sided. Using full rotation with such arrangement, however, would reduce the scanner duty cycle by a factor of 2. In such a case, options available for maximizing speed of a projection system 10 would include mechanical devices that provide reciprocating motion for scanning by scanning ball lens assembly 100. Such an approach, however, would add cost and mechanical complexity and might also require compensation for non-uniform scan velocity.

It is instructive to note that scanning ball lens assembly 100 cannot operate throughout its full rotation, but would have some restriction on its usable range or duty cycle. Where this may be a limiting factor, reciprocating motion of scanning ball lens assembly 100 could provide improved duty cycle that may justify the added cost and mechanical complexity.

It can be appreciated that the arrangement of components shown in FIGS. 1 through 8 present a novel approach to the challenge of achieving wide field of view in a projection system.

Options for Curved Mirror 24 Arrangement

To match the interocular distance of observer 12, the actual shape of curved mirror 24 can be adjusted to vary to some degree from a precise spherical shape. An aspheric shape could be used for curved mirror 24, to minimize off-axis pupil aberration, for example.

Curved mirror 24 can be a fairly expensive component to fabricate using traditional forming, grinding, and polishing techniques. It may be more practical to fabricate mirror 24 from two or more smaller mirror segments, joined together to assemble one large mirror 24.

As yet another alternative embodiment, curved mirror 24 may comprise a membrane mirror, such as a Stretchable Membrane Mirror (SMM), whose curvature is determined by a controlled vacuum generated in an airtight cavity behind a stretched, reflective surface. Use of a stretchable membrane mirror is disclosed in the McKay article, referenced above.

Curved mirror 24 can alternately be embodied using replicated mirrors, Fresnel mirrors, or using one or more or retroreflective surfaces.

Figure 9:
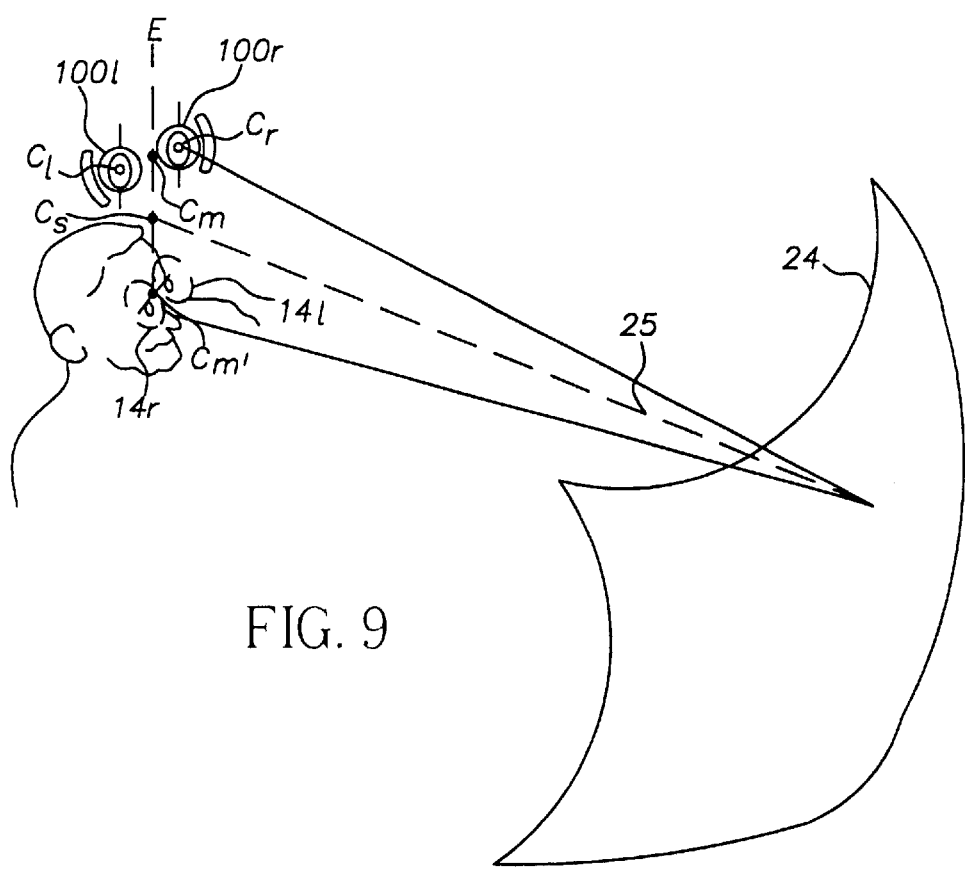
FIG. 9 is a perspective view showing key components of the apparatus of the present invention for an alternate embodiment autostereoscopic imaging system using a curved mirror and essentially paraxial optics.

Referring to FIG. 9, there is shown an alternate, substantially monocentric arrangement in which left and right scanning ball lens assemblies 100*l* and 100*r*, disposed near an optical axis 25, project directly into curved mirror 24, without the use of beamsplitter 16, as was shown in FIGS. 1–4. For such an arrangement, curved mirror 24 must have acceptable off-axis performance, since the image path for each viewing pupil 14*l* and 14*r* must be more than slightly off-center relative to the center of curvature $C_s$ of curved mirror 24. Aspheric mirrors could be employed for such an arrangement. In order for the arrangement of FIG. 9 to be feasible, the ratio of off-axis distance ($C_s$, to $C_m$ in FIG. 9) to the focal length of spherical curved mirror 24 must be small. As a rule-of-thumb, it has been determined that curved mirror 24 with a spherical surface can perform satisfactorily provided that the off-axis angle of left and right scanning ball lens assemblies 100*l* and 100*r* is within approximately 6 degrees.

For off-axis angles in excess of six degrees, an aspherical surface for curved mirror 24 is more suitable. For such an aspherical surface, a first center of curvature point $C_m'$ is located midway between viewing pupils 14*l* and 14*r*. A second center of curvature point $C_m$ is located midway between respective center points $C_l$ and $C_r$ of scanning ball lens assemblies 100*l* and 100*r*. Such an aspherical design could be toroidal and would be monocentric with respect to an axis E passing through points $C_m$ and $C_m'$. In cross-section, curved mirror 24 fabricated in this manner would be elliptical, with points $C_m$ and $C_m'$ serving as foci of the ellipse.

Figure 10:
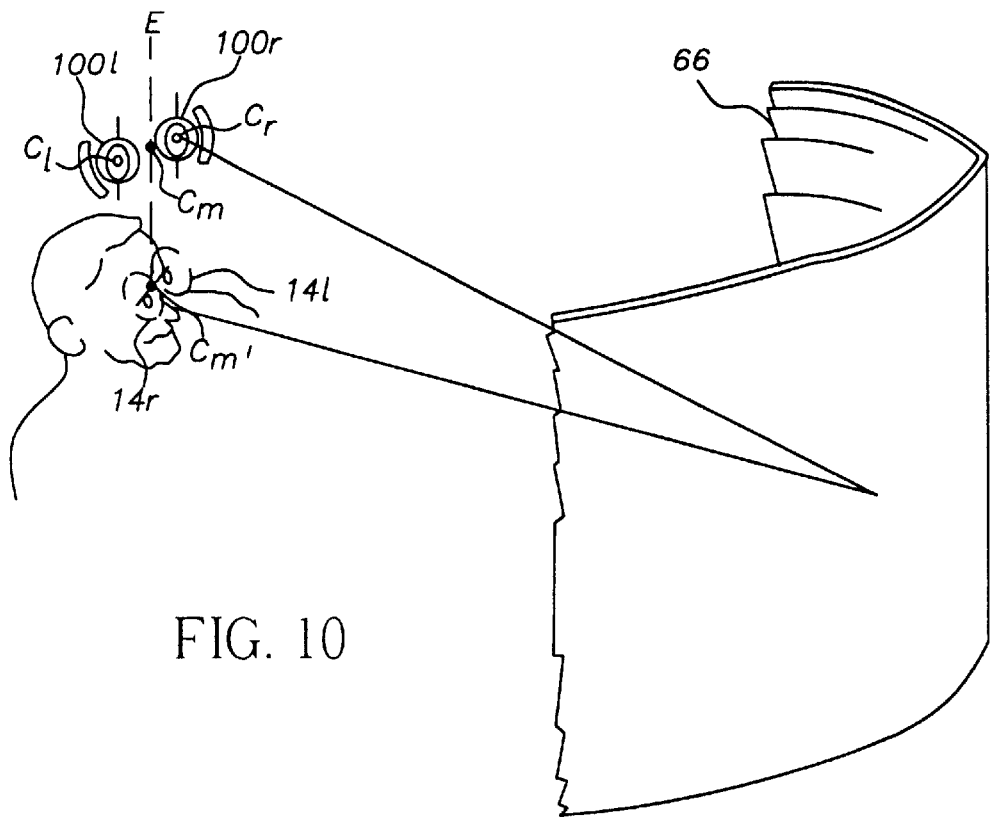
FIG. 10 is a perspective view showing key components of the apparatus of the present invention for another alternate embodiment autostereoscopic imaging system using a Fresnel mirror and essentially paraxial optics.

Referring to FIG. 10, there is shown yet another alternate arrangement, also without beamsplitter 16, similar to that shown in FIG. 9. In FIG. 10, curved mirror 24 is a cylindrically curved, reflective Fresnel mirror 66. The arrangement of components shown in FIG. 10 is monocentric with respect to axis E, as was shown in FIG. 9. Reflective Fresnel mirror 66 has power in only one direction. Reflective Fresnel mirror 66 can be, for example, a planar element fabricated on a flexible substrate, similar to Fresnel optical components manufactured by Fresnel Optics, Rochester, N.Y. Fresnel mirror 66 could be curved into a generally cylindrical shape about axis E, as is shown in FIG. 9. Optionally, Fresnel mirror 66 could be essentially flat. Fresnel mirror 66 would image the exit pupils of scanning ball lens assemblies 100*l*/100*r* onto viewing pupils 14*l*/14*r* in a similar manner to that described above for curved mirror 24.

As yet another option, curved mirror 24 could be replaced using a retroreflective surface, such a surface having an essentially spherical shape with center of curvature coincident with that of scanning ball lens assembly 100. A retroreflective surface would not introduce the image-crossing effect caused by curved mirror reflection. It must be noted, however, that this alternate arrangement would provide a real image, not the virtual image formed by autostereoscopic imaging system 10 in the preferred embodiment.

Optional Embodiments for Linear Image Source 36

Figure 11:
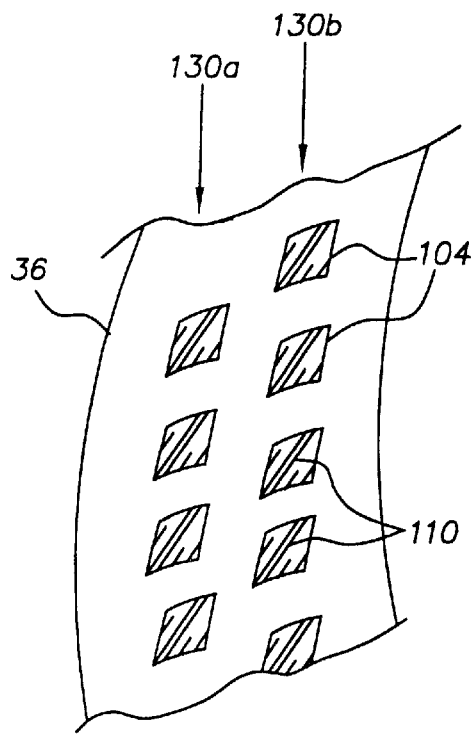
FIG. 11 is a perspective schematic view of light sources according to one embodiment of the present invention.

Linear image source 36 permits a number of variations from the simple model of the preferred embodiment, as described above. As was noted with reference to FIGS. 5 and 6, linear image source 36 provides a linear array of light sources 110, each light source 110 acting as a source pixel 104. Ideally, an array of light sources 110 can be configured to have the necessary spacing and curvature to provide linear image source 36. However, in practice, there may be device limitations that require some modification to the idealized model. As one example, the spacing requirements for light sources 110 may exceed the space available for providing light sources 110 in a single line. FIG. 11 shows an example linear image source 36 in which light sources 110 must be provided in multiple rows 130*a* and 130*b*. Source pixels 104 would then be interleaved in order to form single line image 52 (FIG. 6). The scanning sequence would successively scan rows 130*a* and 130*b* in a coordinated timing sequence that would provide single line image 52, using techniques familiar in the scanning arts. It must be noted that a number of such scanning sequences could be used, with light sources 110 disposed in one, two, or more rows 130*a*, 130*b*.

Figure 12:
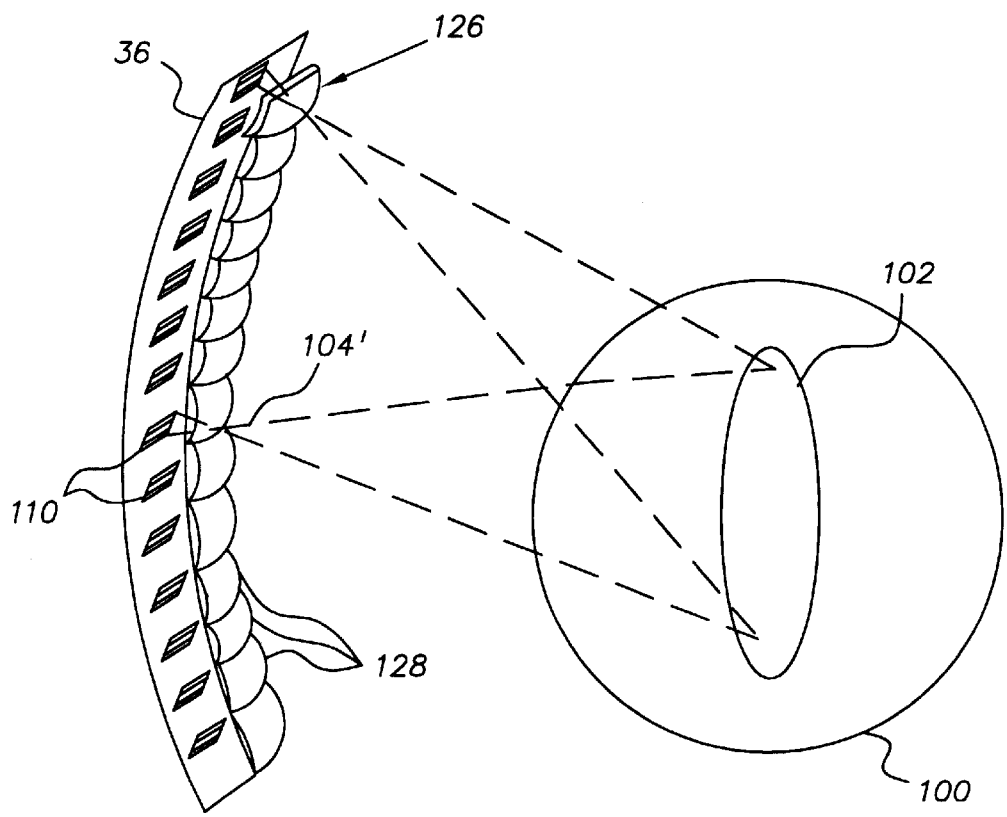
FIG. 12 is a linear array of light sources and lenses according to another embodiment of the present invention.

Referring to FIG. 12, linear image source 36 may also comprise one or more lenses 128, arranged in a lenslet array 126, for example. Lenses 128 can help to maximize brightness for each source pixel 104. In the embodiment of FIG. 12, each light source 110 has a corresponding lens 128 in lenslet array 126. With respect to scanning ball lens assembly 100, the combination of light source 110 and lens 128 forms an effective source pixel 104' at or near the front surface of lens 128. In one embodiment, lenses 128 are essentially spherical.

Figure 13:
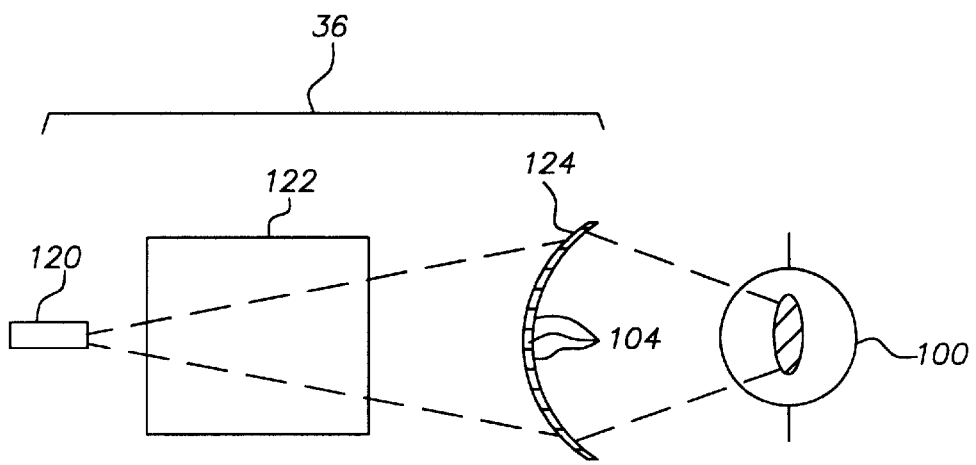
FIG. 13 is a schematic view of a scanning electron beam light source according to the present invention.

CRT and laser scanners form a two-dimensional image by raster scanning of a single point source over a reactive surface. A point source 120 can be used as one component of linear image source 36, as is shown in FIG. 13. Here, point source 120 is scanned through a relay lens 122 and directed towards a reactive surface 124 to form a line of source pixels 104 that can then be directed by scanning ball lens assembly 100. For an electron beam scan, reactive surface 124 would comprise a phosphor screen. For a laser beam scan, reactive surface 124 could comprise a diffusive surface or fluorescent screen. As is represented in FIG. 13, reactive surface 124 is shaped to provide the desired curvature for the array of source pixels 104.

Figure 14:
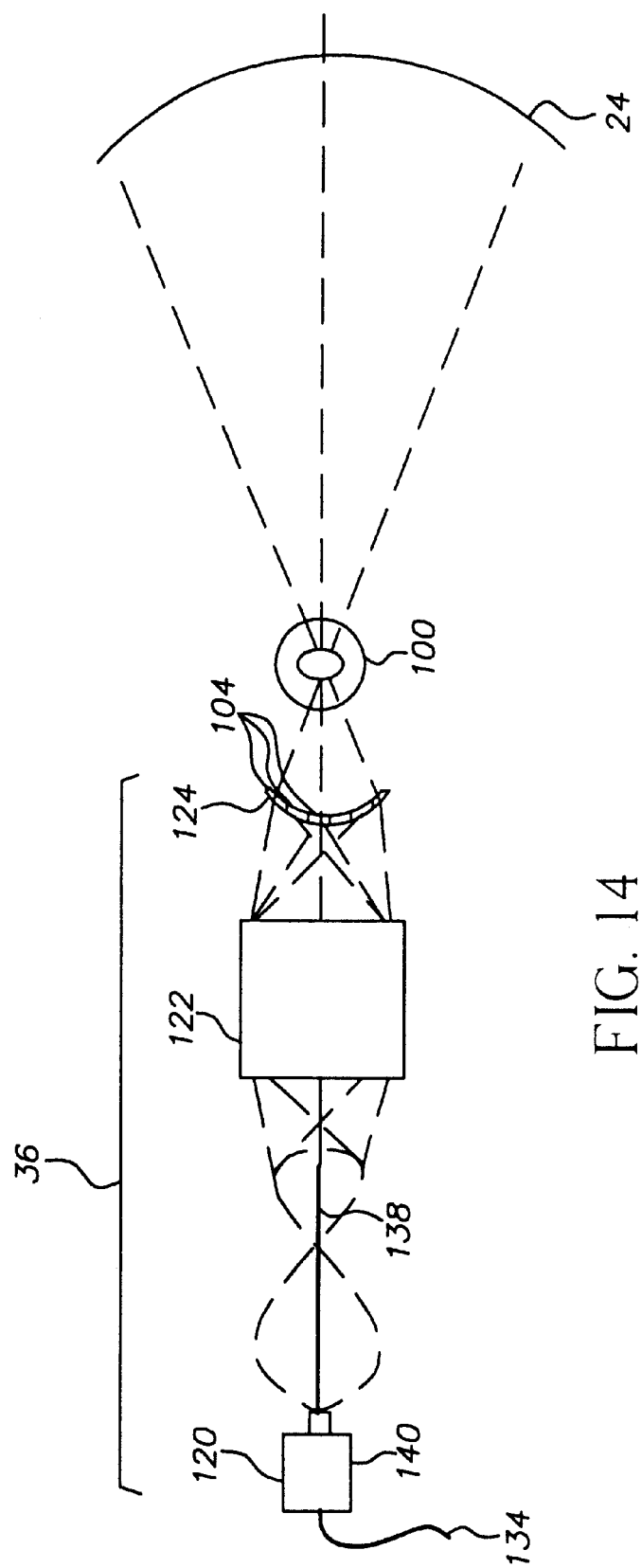
FIG. 14 is a schematic view of another embodiment of the present invention using a resonant fiber optic scan for the light source.

Point source 120 could be an electron beam, a scanned laser, or other type of single-point radiation capable of providing a visible line when scanned across reactive surface 124. Referring to FIG. 14, there is shown one alternative embodiment that employs resonant fiber-optic scanning for linear image source 36. Point source 120 comprises an actuator 140 and a vibrating fiber 138. Cantilevered vibration of fiber 138 by actuator 140 provides a scanning point of light that is directed through relay lens 122 to form a line of source pixels 104 on reactive surface 124. Incoming light, preferably from a laser, can be routed from a suitable light source by means of fiber-optic cable 134.

Actuator 140 could be any of a number of types of actuator adapted to provide the necessary resonant vibration to fiber 138. Examples of suitable types of actuator 140 include piezoelectric bimorph or piezoelectric tube actuators, electromagnetic actuators including electrodynamic devices such as a voice coil, resonant scanners, MEMS (Micro-Electro-Mechanical Structures) actuators, galvanometers, electrostatic actuators; and mechanical actuators, such as one or more motors combined with eccentric cams, for example.

Resonant fiber-optic scanning is described in the article entitled "Single Fiber Endoscope: General Design for Small Size, High Resolution, and Wide Field of View" by Eric J. Seibel, Quinn Y. J. Smithwick, Chris M. Brown, and G. Reinhall, in *Proceedings of SPIE*, Vol. 4158 (2001) pp. 29–39.

Optional Embodiment for Scanning Ball Lens Assembly 100

Figure 15:
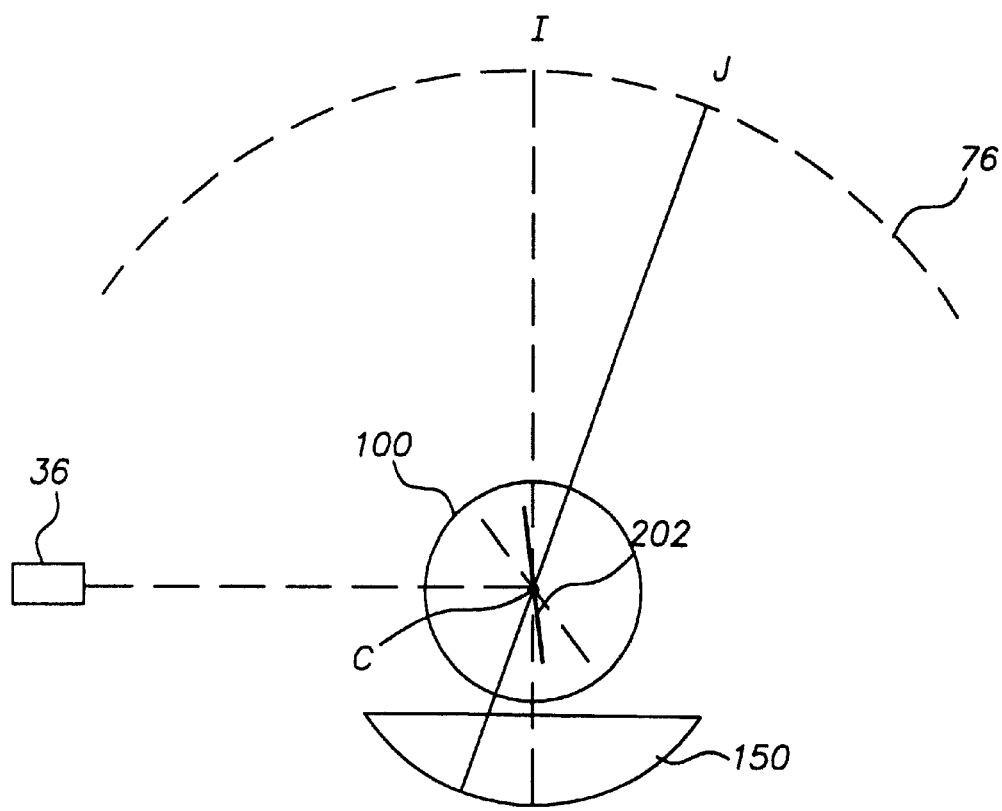
FIG. 15 shows a schematic view of an alternate embodiment of the scanning ball assembly using a beamsplitter surface.

Referring to FIG. 15, there is shown an optional embodiment of the present invention, in which a beamsplitter surface 202, partially reflective, is provided in place of reflective surface 102 within scanning ball lens assembly 100. With this construction, scanning ball lens assembly effectively acts as a refractive, rotating beamsplitter. Light from linear image source 36 reflects from beamsplitter surface 202 onto a spherical mirror 150 and is transmitted through beamsplitter surface 202 to form intermediate image 76. FIG. 15 shows one possible scan path, with scanning ball lens assembly 100 rotating in a clockwise direction, tracing out lines of intermediate image 76 from initial position I to subsequent position J. With this arrangement, curved linear image source 36 is conjugate to the surface of spherical mirror 150. Spherical mirror 150 can provide a substantially spherical surface, with its center of curvature coincident with center C of scanning ball lens assembly 100.

The alternate arrangement of optical components shown in FIG. 15 offers an additional, practical design advantage. Magnification between the conjugate surfaces of linear image source 36 and spherical mirror 150 allows linear image source 36 to be larger than is feasible with other embodiments, alleviating size constraints and lowering the cost of linear image source 36.

The preferred embodiment of the present invention provides an exceptionally wide field of view and the required brightness for stereoscoping imaging in excess of the 90-degree range, with viewing pupil 14 size near 20 mm. Moreover, scanning ball lens assembly 100 provides excellent off-axis performance and allows a wider field of view, possibly up to 180 degrees. This provides an enhanced viewing experience for observer 12, without requiring that headset, goggles, or other device be worn.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, there are many possible arrangements for supporting projection optics, for color multiplexing and sequencing, and for mirror surfaces that could be used with the monocentric arrangement of components disclosed for this invention.

Thus, what is provided is a monocentric optical apparatus for autostereoscopic display, using a scanned linear image source, providing a very wide field of view and large viewing pupils.

PARTS LIST

10. Autostereoscopic imaging system
12. Observer
14. Viewing pupil
14*l*. Left viewing pupil
14*r*. Right viewing pupil
16. Beamsplitter
22. Front focal surface
24. Curved mirror
25. Optical axis
32. Motor
36. Linear image source
36*l*. Left linear image source
36*r*. right linear image source
42. Meniscus lens
44. Meniscus lens
46. Spherical lens
48. Stop
52. Intermediate line image
52'. Intermediate line image
66. Fresnel mirror
68. Human eye pupil
68*l*. Left human eye pupil
68*r*. Right human eye pupil
70. Image generation system
70*l*. Left image generation system
70*r*. Right image generation system
76. Intermediate image
76*l*. Left intermediate image
76*r*. Right intermediate image
100. Scanning ball lens assembly
100*l*. Left scanning ball lens assembly
100*r*. Right scanning ball lens assembly
102. Reflective surface
104. Source pixel
104'. Effective source pixel
106. Virtual image
108. Image pixel
110. Light source
112. Hemispheric lens segment
120. Point source
122. Relay lens
124. Reactive surface
126. Lenslet array
128. Lens
130*a*. Rows
130*b*. Rows
134. Fiber optic cable
136*r*. Red linear array
136*g*. Green linear array
136*b*. Blue linear array
138. Fiber
140. Actuator
150. Spherical mirror
202. Beamsplitter surface

What is claimed is:

1. An autostereoscopic optical apparatus for displaying a stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) a left image generation system for forming a left intermediate image as a two-dimensional image and a right image generation system for forming a right intermediate image as a two-dimensional image, wherein both left and right image generation systems are similarly constructed of separate components, with each image generation system comprising:

(a1) a linear image source for forming a line of source pixels;

(a2) a scanning ball lens assembly for projecting said line of source pixels to form an intermediate line image, said scanning ball lens assembly comprising:

(a2a) at least one reflective surface for reflecting light from said line of source image pixels to said intermediate line image, (a2b) a ball lens segment having a scanning ball lens pupil, said ball lens segment having a center of curvature on said at least one reflective surface, (a3c) said scanning ball lens assembly rotating about an axis and forming a series of said intermediate line images in order to sequentially form said intermediate image as a scanned two-dimensional image thereby;

(b) a curved mirror having a center of curvature placed substantially optically midway between said scanning ball lens assembly for said left image generation system and said scanning ball lens assembly for said right image generation system;

(c) a beamsplitter disposed to fold an optical path from said left image generation system to form said left intermediate image near a front focal surface of said curved mirror and to fold an optical path from said right image generation system to form said right intermediate image near said front focal surface of said curved mirror; and (d) said curved mirror forming said virtual stereoscopic image of said left and right intermediate images and, through said beamsplitter, forming a real image of said left scanning ball lens pupil at said left viewing pupil and a real image of said right scanning ball lens pupil at said right viewing pupil.

2. The autostereoscopic optical apparatus of claim 1 wherein said apparatus is monocentric.

3. The autostereoscopic optical apparatus of claim 1 wherein said linear image source comprises a plurality of LEDs.

4. The autostereoscopic optical apparatus of claim 1 wherein said linear image source comprises a scanned laser.

5. The autostereoscopic optical apparatus of claim 1 wherein said linear image source comprises a relay lens.

6. The autostereoscopic optical apparatus of claim 1 wherein said linear image source comprises a fluorescent surface.

7. The autostereoscopic optical apparatus of claim 1 wherein said linear image source comprises a diffusive surface.

8. The autostereoscopic optical apparatus of claim 1 wherein said at least one reflective surface is a beamsplitter.

9. The autostereoscopic optical apparatus of claim 1 wherein said linear image source comprises a vibrating optical fiber.

10. The autostereoscopic optical apparatus of claim 1 wherein said linear image source comprises an actuator for providing resonant vibration to a point source.

11. The autostereoscopic optical apparatus of claim 1 wherein said ball lens segment is hemisphere.

12. The autostereoscopic optical apparatus of claim 1 further comprising a motor for rotating said left scanning ball lens assembly.

13. The autostereoscopic optical apparatus of claim 1 further comprising a motor for actuating said right scanning ball lens assembly.

14. The autostereoscopic optical apparatus of claim 1 further comprising a motor for actuating both said left scanning ball lens assembly and said right scanning ball lens assembly.

15. The autostereoscopic optical apparatus of claim 14 wherein said motor rotates both said left scanning ball lens assembly and said right scanning ball lens assembly in the same direction.

16. The autostereoscopic optical apparatus of claim 14 wherein said motor rotates said left scanning ball lens assembly in one direction and said right scanning ball lens assembly in the opposite direction.

17. The autostereoscopic optical apparatus of claim 1 wherein said curved mirror comprises a plurality of mirror segments.

18. The autostereoscopic optical apparatus of claim 17 wherein said plurality of mirror segments comprises at least one spherical mirror.

19. The autostereoscopic optical apparatus of claim 17 wherein said plurality of mirror segments comprises at least two replicated mirrors.

20. The autostereoscopic optical apparatus of claim 1 wherein said curved mirror is essentially spherical.

21. The autostereoscopic optical apparatus of claim 1 wherein said curved mirror comprises a stretched membrane.

22. The autostereoscopic optical apparatus of claim 1 wherein said curved mirror comprises a Fresnel mirror.

23. The autostereoscopic optical apparatus of claim 1 wherein said at least one reflective surface is planar.

24. The autostereoscopic optical apparatus of claim 1 wherein said at least one reflective surface comprises an interference coating.

25. The autostereoscopic optical apparatus of claim 1 wherein said scanning ball lens assembly further comprises at least one meniscus lens.

26. The autostereoscopic optical apparatus of claim 25, wherein both surfaces of said meniscus lens share a common center of curvature with said ball lens segment.

27. The autostereoscopic optical apparatus of claim 1 wherein said scanning ball lens assembly comprises a refractive liquid.

28. The autostereoscopic optical apparatus of claim 1 wherein said linear image source is disposed in a curve.

29. The autostereoscopic optical apparatus of claim 28 wherein said curve shares said center of curvature with said ball lens segment.

30. The autostereoscopic optical apparatus of claim 1 wherein said linear image source comprises at least one red light source.

31. The autostereoscopic optical apparatus of claim 1 wherein said linear image source comprises at least one blue light source.

32. The autostereoscopic optical apparatus of claim 1 wherein said linear image source comprises at least one green light source.

33. The autostereoscopic optical apparatus of claim 1 wherein said left image generation system and said right image generation system each further comprise a lenslet array for conditioning light emitted from said linear image source.

34. The autostereoscopic optical apparatus of claim 1 wherein said scanning ball lens assembly rotates less than about 180 degrees about said axis, said scanning ball lens assembly scanning in a reciprocating motion thereby.

35. The autostereoscopic optical apparatus of claim 1 further comprising an additional linear image source for forming a line of source pixels.

36. The autostereoscopic optical apparatus of claim 1 wherein said linear image source comprises an electron beam.

37. An autostereoscopic optical apparatus for displaying a stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) a left image generation system for forming a left intermediate image as a two-dimensional image and a right image generation system for forming a right intermediate image as a two-dimensional image, wherein both left and right image generation systems are similarly constructed of separate components, with each image generation system comprising:

(a1) a linear image source for forming a line of source pixels;

(a2) a scanning ball lens assembly for projecting said line of source pixels to form an intermediate line image, said scanning ball lens assembly comprising:

(a2a) at least one reflective surface for reflecting light from said line of source image pixels to said intermediate line image;

(a2b) a ball lens segment having a scanning ball lens pupil, said ball lens segment having a center of curvature on said at least one reflective surface;

(a2c) said scanning ball lens assembly rotating about an axis and forming a series of said intermediate line images in order to sequentially form said intermediate image as a scanned two-dimensional image thereby; and (b) a curved mirror having a center of curvature placed substantially optically midway between said scanning ball lens assembly for said left image generation system and said scanning ball lens assembly for said right image generation system, said curved mirror disposed to form a virtual stereoscopic image from said intermediate images formed by said left and right image generation systems, and said curved mirror disposed to form a real image of said scanning ball lens pupil for said left image generation system at said left viewing pupil and a real image of said scanning ball lens pupil for said right image generation system at said right viewing pupil.

38. The autostereoscopic optical apparatus of claim 37 wherein said curved mirror is cylindrical.

39. The autostereoscopic optical apparatus of claim 37 wherein said curved mirror is toroidal.

40. The autostereoscopic optical apparatus of claim 37 wherein said linear image source comprises a plurality of LEDs.

41. The autostereoscopic optical apparatus of claim 37 wherein said linear image source comprises a scanned laser.

42. The autostereoscopic optical apparatus of claim 37 wherein said linear image source comprises a relay lens.

43. The autostereoscopic optical apparatus of claim 37 wherein said linear image source comprises a fluorescent surface.

44. The autostereoscopic optical apparatus of claim 37 wherein said linear image source comprises a diffusive surface.

45. The autostereoscopic optical apparatus of claim 37 wherein said at least one reflective surface is a beamsplitter.

46. The autostereoscopic optical apparatus of claim 37 wherein said linear image source comprises a vibrating optical fiber.

47. The autostereoscopic optical apparatus of claim 37 wherein said linear image source comprises an actuator for providing resonant vibration to a point source.

48. The autostereoscopic optical apparatus of claim 37 wherein said ball lens segment is hemisphere.

49. The autostereoscopic optical apparatus of claim 37 further comprising a motor for rotating said left scanning ball lens assembly.

50. The autostereoscopic optical apparatus of claim 37 further comprising a motor for actuating said right scanning ball lens assembly.

51. The autostereoscopic optical apparatus of claim 37 further comprising a motor for actuating both said left scanning ball lens assembly and said right scanning ball lens assembly.

52. The autostereoscopic optical apparatus of claim 51 wherein said motor rotates both said left scanning ball lens assembly and said right scanning ball lens assembly in the same direction.

53. The autostereoscopic optical apparatus of claim 51 wherein said motor rotates said left scanning ball lens assembly in one direction and said right scanning ball lens assembly in the opposite direction.

54. The autostereoscopic optical apparatus of claim 37 wherein said curved mirror comprises a plurality of mirror segments.

55. The autostereoscopic optical apparatus of claim 54 wherein said plurality of mirror segments comprises at least one spherical mirror.

56. The autostereoscopic optical apparatus of claim 54 wherein said plurality of mirror segments comprises at least two replicated mirrors.

57. The autostereoscopic optical apparatus of claim 37 wherein said curved mirror is essentially spherical.

58. The autostereoscopic optical apparatus of claim 37 wherein said curved mirror comprises a stretched membrane.

59. The autostereoscopic optical apparatus of claim 37 wherein said curved mirror comprises a Fresnel mirror.

60. The autostereoscopic optical apparatus of claim 37 wherein said at least one reflective surface is planar.

61. The autostereoscopic optical apparatus of claim 37 wherein said at least one reflective surface comprises an interference coating.

62. The autostereoscopic optical apparatus of claim 37 wherein said scanning ball lens assembly further comprises at least one meniscus lens.

63. The autostereoscopic optical apparatus of claim 62, wherein both surfaces of said meniscus lens share a common center of curvature with said ball lens segment.

64. The autostereoscopic optical apparatus of claim 37 wherein said scanning ball lens assembly comprises a refractive liquid.

65. The autostereoscopic optical apparatus of claim 37 wherein said linear image source is disposed in a curve.

66. The autostereoscopic optical apparatus of claim 65 wherein said curve shares said center of curvature with said ball lens segment.

67. The autostereoscopic optical apparatus of claim 37 wherein said linear image source comprises at least one red light source.

68. The autostereoscopic optical apparatus of claim 37 wherein said linear image source comprises at least one blue light source.

69. An autostereoscopic optical apparatus of claim 37 wherein said linear image source comprises at least one green light source.

70. The autostereoscopic optical apparatus of claim 37 wherein said left image generation system further comprises a lenslet array for conditioning light emitted from said linear image source.

71. The autostereoscopic optical apparatus of claim 37 wherein said right image generation system further comprises a lenslet array for conditioning light emitted from said linear image source.

72. The autostereoscopic optical apparatus of claim 37 wherein said scanning ball lens assembly rotates less than about 180 degrees about said axis, said scanning ball lens assembly scanning in a reciprocating motion thereby.

73. The autostereoscopic optical apparatus of claim 37 further comprising an additional linear image source for forming a line of source pixels.

74. The autostereoscopic optical apparatus of claim 37 wherein said linear image source comprises an electron beam.

75. A method for display of a stereoscopic virtual image to an observer, the image comprising a left image to be viewed by the observer at a left viewing pupil and a right image to be viewed by the observer at a right viewing pupil, the method comprising the steps of:

(a) forming a left intermediate image as a two-dimensional image, comprising a plurality of sequential left intermediate line images, near the focal surface of a curved mirror, each left intermediate line image formed by the steps of
  (a1) rotating a left scanning ball lens assembly to a predetermined position;
  (a2) generating a line of source pixels of said left intermediate image;
  (a3) projecting said line of source pixels of said left intermediate image using said left scanning ball lens assembly to form said left intermediate line image near said focal surface of said curved mirror;
(b) forming a right intermediate image as a two-dimensional image, comprising a plurality of sequential right intermediate line images, near the focal surface of said curved mirror, each right intermediate line image formed by the steps of
  (b1) rotating a right scanning ball lens assembly to a predetermined position;
  (b2) generating a line of source pixels of said right intermediate image;
  (b3) projecting said line of source pixels of said right intermediate image using said right scanning ball lens assembly to form said right intermediate line image near said focal surface of said curved mirror;
(c) forming a left virtual image from said left intermediate image, said left virtual image viewable from said left viewing pupil, said left viewing pupil formed by said curved mirror as an image of said left scanning ball lens pupil; and
(d) forming a right virtual image from said right intermediate image, said right virtual image viewable from said right viewing pupil, said right viewing pupil formed by said curved mirror as an image of said right scanning ball lens pupil.

76. The method of claim 75 wherein the step of forming said left intermediate line image comprises the step of projecting each said line of source pixels of said left intermediate image through a beamsplitter.

77. The method of claim 75 further comprising the step of adjusting the displacement between a left image generation system and a right image generation system to adapt to operator interocular distance.

78. The method of claim 75 wherein the step of generating a line of source pixels comprises the step of illuminating at least one LED.

79. The method of claim 75 wherein the step of generating a line of source pixels comprises the step of energizing at least one laser.

80. The method of claim 75 wherein the step of generating a line of source pixels comprises the step of providing an electron beam.

81. The method of claim 75 wherein the step of generating a line of source pixels comprises the step of vibrating an optical fiber.

82. An autostereoscopic optical apparatus for displaying a stereoscopic virtual image comprising a two-dimensional array of image pixels, said stereoscopic image comprising a left image to be viewed by an observer at a left viewing pupil and a right image to be viewed by the observer at a right viewing pupil, a method for providing an adjusted aspect ratio of an adjusted height and an adjusted width for the left image and for the right image, the method comprising the steps of:
(a) forming a left intermediate image as a two-dimensional image, comprising a plurality of sequential left intermediate line images, near the focal surface of a curved mirror, each left intermediate line image formed with the steps of:
  (a1) rotating a left scanning ball lens assembly to a predetermined position according to said adjusted width;
  (a2) generating a line of source pixels of said left intermediate image, the number of said source pixels based on said adjusted height;
  (a3) projecting said line of source pixels of said left intermediate image using said left scanning ball lens assembly to form said left intermediate line image near said focal surface of said curved mirror;
(b) forming a right intermediate image as a two-dimensional image, comprising a plurality of sequential right intermediate line images, near the focal surface of a curved mirror, each right intermediate line image formed with the steps of:
  (b1) rotating a right scanning ball lens assembly to a predetermined position according to said adjusted width;
  (b2) generating a line of source pixels of said right intermediate image, the number of said source pixels based on said adjusted height;
  (b3) projecting said line of source pixels of said right intermediate image using said right scanning ball lens assembly to form said right intermediate line image near said focal surface of said curved mirror;
(c) forming a left virtual image from said left intermediate image, said left virtual image viewable from said left viewing pupil, said left viewing pupil formed by said curved mirror as an image of said left scanning ball lens pupil; and
(d) forming a right virtual image from said right intermediate image, said right virtual image viewable from said right viewing pupil, said right viewing pupil formed by said curved mirror as an image of said right scanning ball lens pupil.

* * * * *